(12) United States Patent
Richards et al.

(10) Patent No.: US 11,421,720 B2
(45) Date of Patent: Aug. 23, 2022

(54) RETENTION DEVICE FOR SUPPORTING A COMPONENT AND METHOD OF USE

(71) Applicant: WHIRLPOOL CORPORATION, Benton Harbor, MI (US)

(72) Inventors: Michael S. Richards, St. Joseph, MI (US); Ryan J. Rutter, St. Joseph, MI (US); Anthony F. Wojtowicz, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 805 days.

(21) Appl. No.: 16/248,105

(22) Filed: Jan. 15, 2019

(65) Prior Publication Data

US 2020/0224689 A1 Jul. 16, 2020

(51) Int. Cl.
*F16B 21/00* (2006.01)
*F16B 5/02* (2006.01)
*F16B 33/00* (2006.01)

(52) U.S. Cl.
CPC .......... *F16B 5/0208* (2013.01); *F16B 33/004* (2013.01)

(58) Field of Classification Search
CPC ..... F16B 5/0208; F16B 33/004; F16B 5/0036
USPC ................................. 411/107, 349
See application file for complete search history.

(56) References Cited

U.S. PATENT DOCUMENTS

| | | | | |
|---|---|---|---|---|
| 2,704,680 A * | 3/1955 | Bedford, Jr. | .......... | F16B 37/041 24/627 |
| 2,745,458 A * | 5/1956 | Bedford, Jr. | .......... | F16B 37/041 411/173 |
| 3,186,049 A * | 6/1965 | Fiddler | .................... | F16B 5/128 24/290 |
| 3,244,056 A * | 4/1966 | Bryan | ..................... | F16B 37/04 411/340 |
| 4,850,063 A * | 7/1989 | Abbate | .................. | E03D 11/16 411/85 |
| 4,907,923 A * | 3/1990 | McGrath, Jr. | ............ | E03D 11/14 411/908 |
| 5,104,272 A | 4/1992 | Dupont et al. | | |
| 5,106,250 A | 4/1992 | Fischer et al. | | |
| 5,201,623 A | 4/1993 | Benedetti et al. | | |
| 5,222,851 A * | 6/1993 | Dickerson | ............... | E03D 11/16 4/252.1 |
| 6,086,300 A * | 7/2000 | Frohlich | ............... | F16B 37/045 411/107 |
| 6,692,140 B2 * | 2/2004 | Wu | ........................ | F21S 8/065 362/370 |
| 6,814,530 B2 | 11/2004 | Franco et al. | | |
| 7,874,774 B2 * | 1/2011 | Peterson | ............... | B60P 7/0815 410/104 |
| 9,106,012 B2 * | 8/2015 | Gross, III | ............ | H01R 13/622 |
| 9,169,629 B2 * | 10/2015 | Jensen | .................... | E03D 11/16 |

(Continued)

*Primary Examiner* — Gary W Estremsky (74) *Attorney, Agent, or Firm* — Price Heneveld LLP (57) ABSTRACT

A retention device for supporting a component relative to a wall of a home appliance is provided. The retention device includes a backing nut and a core piece that can be installed from a single side of the wall. The backing nut defines a central bore and includes a threaded surface. The core piece includes a body having a threaded portion configured to mate with the threaded surface of the backing nut and at least one flange projecting outwardly from a body of the core piece. The core piece is configured to be inserted into an aperture in the wall and rotated to engage the at least one flange with the wall.

17 Claims, 9 Drawing Sheets

(56) References Cited

U.S. PATENT DOCUMENTS

| | | | |
|---|---|---|---|
| 9,450,328 B2* | 9/2016 | Lindkamp | H02G 3/22 |
| 9,666,973 B1* | 5/2017 | Strahl | H01R 13/622 |
| 9,765,529 B2* | 9/2017 | Porter | E04F 13/0805 |
| 2005/0201844 A1 | 9/2005 | Davies et al. | |
| 2012/0049509 A1* | 3/2012 | Lininger | F16L 9/06 |
| | | | 285/93 |
| 2014/0366335 A1* | 12/2014 | Stothers | F16B 35/06 |
| | | | 24/305 |

* cited by examiner

RETENTION DEVICE FOR SUPPORTING A COMPONENT AND METHOD OF USE

BACKGROUND OF THE DISCLOSURE

The present disclosure generally relates to a retention device for supporting a component relative to a surface, and more specifically to a retention device for supporting a component of a home appliance, such as a shelf, rack, tray, or drawer, relative to a surface of the home appliance.

SUMMARY OF THE DISCLOSURE

One aspect of the present disclosure relates to a retention device for supporting a component relative to a wall at least partially defining a chamber of a home appliance. The retention device includes a backing nut and a core piece. The backing nut defines a central bore having a threaded surface. The core piece includes a body including a first end having a threaded portion configured to mate with the threaded surface and at least one flange disposed at a second end of the body, opposite the first end. The at least one flange projects outwardly away from the body. The core piece further includes at least one rib extending along at least a portion of the body between the flange and the first end. The second end of the body is configured to be inserted into an aperture in said wall and rotated to engage the at least one flange with said wall and engage the at least one rib with an edge of said wall defining the aperture. The backing nut can be configured to be threaded onto the first end of the body to secure the core piece relative to said wall.

Another aspect of the present disclosure includes a retention device for supporting a component relative to a mounting surface. The retention device can include a backing nut including a threaded central bore and a core piece. The core piece includes a body having a first end configured to be threadingly received by the central bore and a second end opposite the first end and configured to engage said mounting surface adjacent an aperture in which the core piece is configured to be inserted. The core piece can also include a mounting structure adjacent the second end which is configured to mate with a component support structure to support said component relative to the mounting surface. The core piece and backing nut can both be installed from a first side of said mounting surface and the mounting structure can be accessible on a second side of said mounting surface opposite the first side.

These and other features, advantages, and objects of the present disclosure will be further understood and appreciated by those skilled in the art by reference to the following specification, claims, and appended drawings.

BRIEF DESCRIPTION OF THE DRAWINGS

Further advantages and features according to the present disclosure will become clear from the following detailed description provided as a non-limiting example, with reference to the attached drawings in which.

2

The components in the figures are not necessarily to scale, emphasis instead being placed upon illustrating the principles described herein.

DETAILED DESCRIPTION

The present illustrated aspects of the present disclosure reside primarily in combinations of method steps and apparatus components relating to a retention device for supporting a component relative to a mounting surface, and in some aspects to a single-sided retention device for supporting a component of a home appliance relative to a surface of the home appliance. Non-limiting examples of a home appliance includes laundry machines, refrigerators, freezers, dishwashers, ovens, ranges, and microwave ovens. Accordingly, the apparatus components and method steps have been represented, where appropriate, by conventional symbols in the drawings, showing only those specific details that are pertinent to understanding the aspects of the present disclosure so as not to obscure the disclosure with details that will be readily apparent to those of ordinary skill in the art having the benefit of the description herein. Further, like numerals in the description and drawings represent like elements.

Figure 1A:
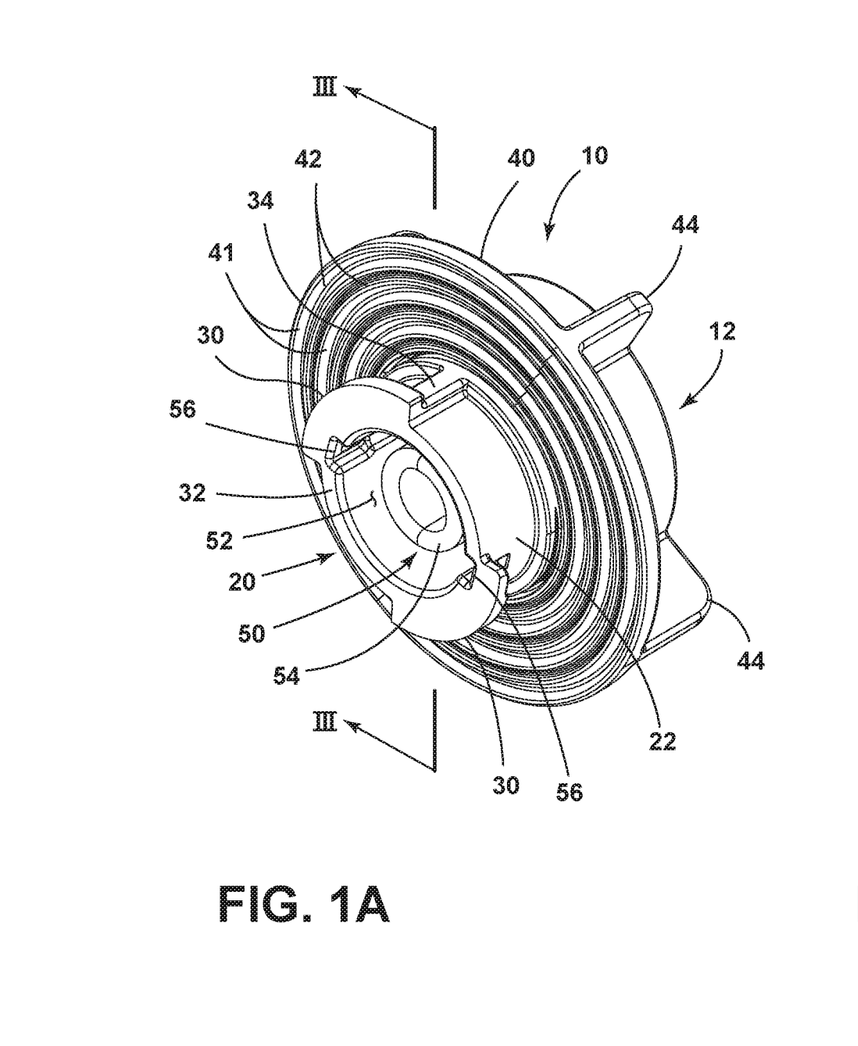
FIG. 1A is a front perspective view of a retention device according to an aspect of the present disclosure.

For purposes of description herein, the terms "upper," "lower," "right," "left," "rear," "front," "vertical," "horizontal," and derivatives thereof shall relate to the disclosure as oriented in FIG. 1A. Unless stated otherwise, the term "front" shall refer to the surface of the element intended to be accessible for use after installation of the retention device in supporting a component, and the term "rear" shall refer to the opposite side of the retention device that is utilized during installing of the retention device. However, it is to be understood that the disclosure may assume various alternative orientations, except where expressly specified to the contrary. It is also to be understood that the specific devices and processes illustrated in the attached drawings, and described in the following specification are simply exemplary aspects of the present disclosure defined in the appended claims. Hence, specific dimensions and other physical characteristics relating to the aspects disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Figure 1B:
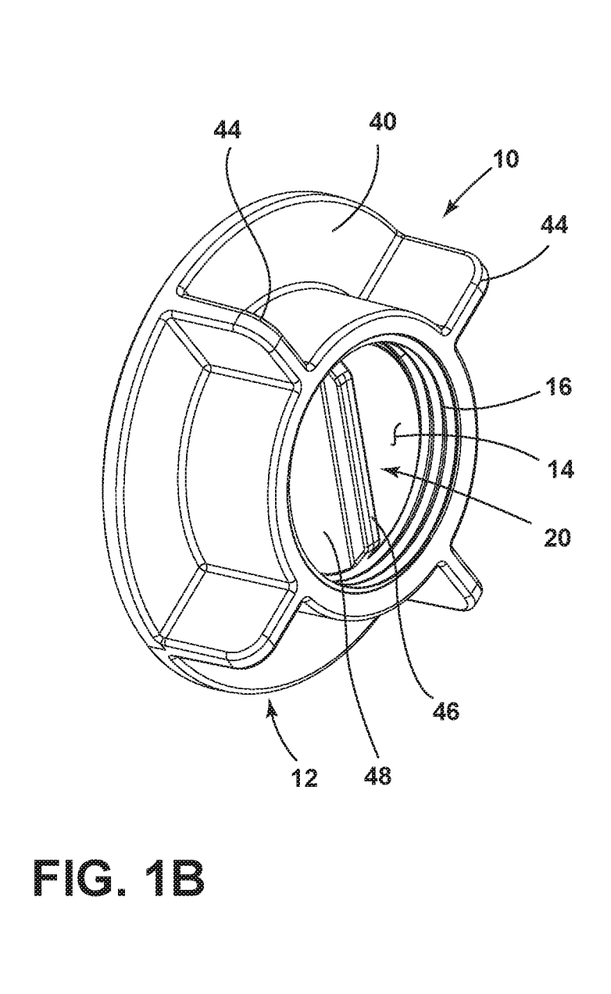
FIG. 1B is a rear perspective view of a retention device according to an aspect of the present disclosure.
Figure 2:
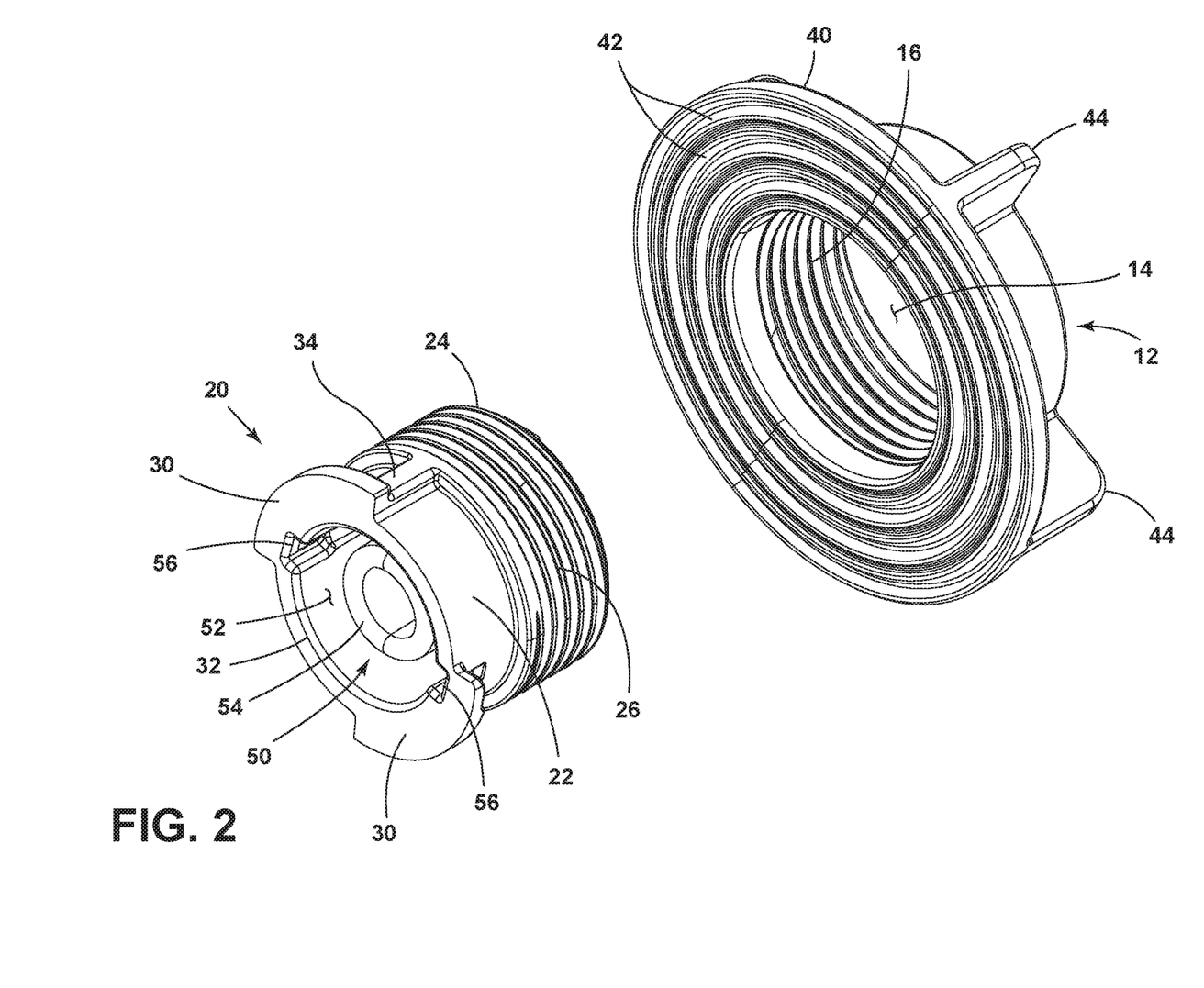
FIG. 2 is an exploded perspective view of the retention device of FIGS. 1A and 1B according to an aspect of the present disclosure.
Figure 3:
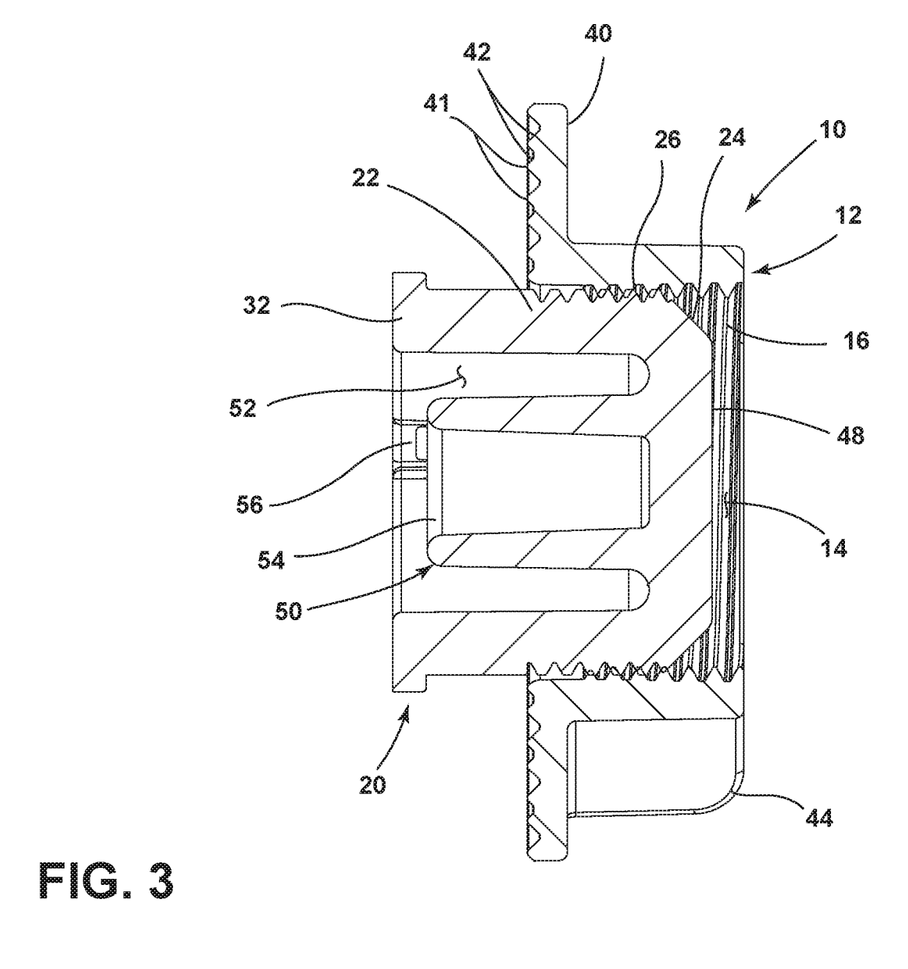
FIG. 3 is a cross-sectional view of the retention device of FIG. 1A taken at III-Ill according to an aspect of the present disclosure.

Referring to FIGS. 1-3, reference numeral 10 generally designates a retention device including a backing nut 12 defining a central bore 14 which includes a threaded surface 16. The retention device 10 also includes a core piece 20 having a body 22 that includes a first end 24 having a threaded portion 26 configured to mate with the threaded surface 16 of the backing nut 12. The core piece 20 includes at least one flange 30 disposed at a second end 32 of the body 22 which projects outwardly away from the body 22. At least one rib 34 is provided on the body 22 and extends along at least a portion of the body 22 between the at least one flange 30 and the first end 24. The second end 32 of the body 22 is configured to be inserted into an aperture in a wall or other mounting surface and rotated to engage the at least one flange 30 with the wall and to engage the at least one rib 34 with an edge of the wall defining the aperture. The backing nut 12 is configured to be threaded onto the first end 24 of the body 22 to secure the core piece 20 relative to the wall.

Still referring to FIGS. 1-3, the backing nut 12 includes a lip 40 extending outward, away from the central bore 14. The lip 40 can be a circumferential lip extending around an entire circumference of the central bore 14, as illustrated, or can optionally extend only partially around the circumference of the central bore 14. Optionally, the lip 40 includes one or more sets of alternating ridges 41 and grooves 42 formed in an underside of the lip 40. Optionally, the backing nut 12 includes one or more radially extending fingers 44. While the backing nut 12 is illustrated as including four radially extending fingers 44 spaced about a periphery of the backing nut 12, the number and dimensions of the radially extending fingers 44 can vary.

The core piece 20 can include one or more flanges 30 projecting outwardly away from the body 22 and in the present example is illustrated as including a pair of flanges 30. Optionally, the core piece 20 can include a single flange 30, a pair of flanges 30 (as illustrated), or more than two flanges 30. The core piece 20 can optionally include a rib 46 projecting from an end surface 48 formed at the first end 24 of the body 22.

The core piece 20 also includes a mounting structure 50 adjacent the second end 32 of the body 22. The shape and dimensions of the mounting structure 50 can vary depending on the component with which the mounting structure 50 is intended to couple with. In the example of FIGS. 1-3, the mounting structure 50 includes a socket 52 formed in the second end 32 of the body 22 and a pin 54 disposed within the socket 52. Optionally, the mounting structure 50 includes one or more channels 56 formed in a surface of the body 22 defining the socket 52.

The backing nut 12 and core piece 20 can be made from any suitable material, non-limiting examples of which include polymeric materials (natural or synthetic materials), metals, and metal alloys. The backing nut 12 and core piece 20 can be made from the same or different materials.

Figure 4:
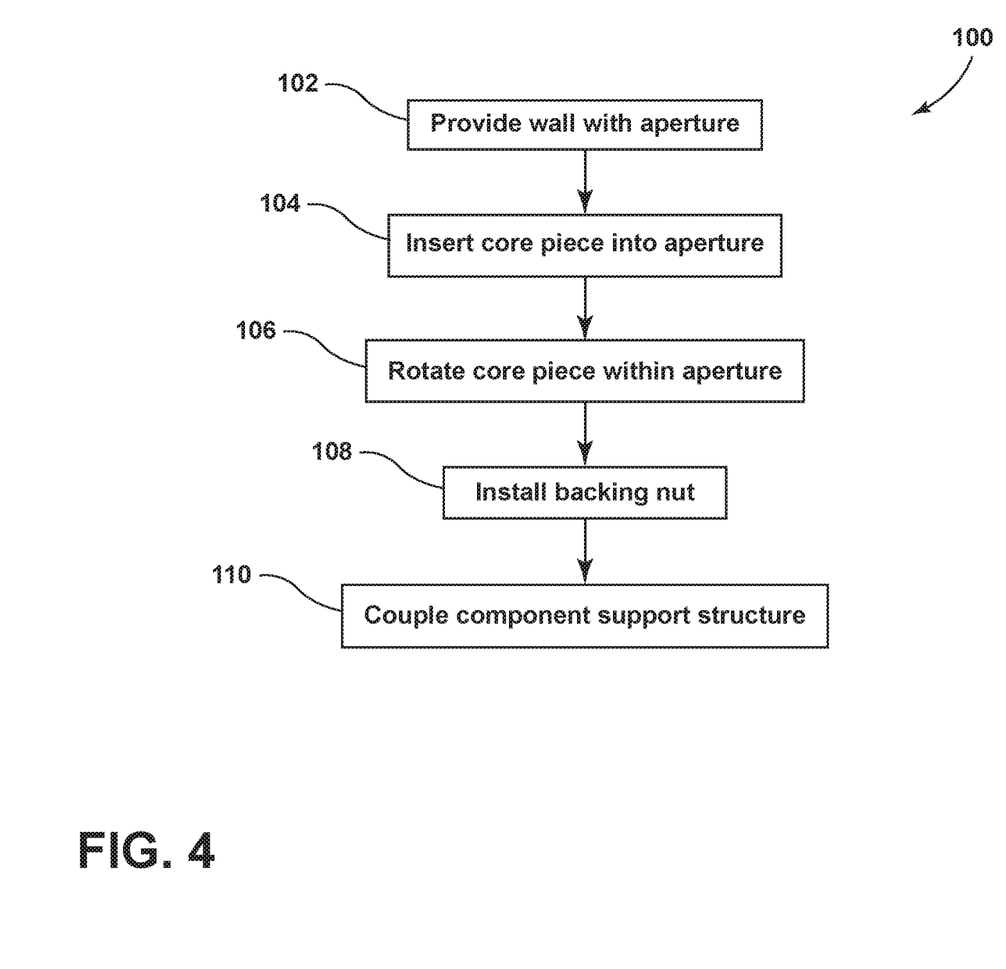
FIG. 4 is flow chart illustrating a method of assembling a retention device with a home appliance according to an aspect of the present disclosure.

Referring now to FIG. 4, a method 100 for installing a retention device in a wall according to an aspect of the present disclosure is illustrated. While the method 100 is discussed in the context of the retention device 10, it is understood that the method 100 can be implemented in a similar manner to install any of the other retention devices of the present disclosure. The method 100 begins at 102 with providing a wall having an aperture into which the retention device 10 is to be installed. As used herein, the term wall refers to a structure that defines or partially defines an open, enclosed, or partially enclosed chamber or space of a home appliance, such as a housing, a liner, or other component of a home appliance (e.g., a shelf, rack, tray, or drawer). However, it is understood that the retention device 10 can be installed in any mounting surface in a similar manner.

At 104, the core piece 20 can be aligned with and inserted into the aperture. The aperture has a shape that is complementary to a cross-sectional shape of the second end 32 of the body 22, including the flanges 30, such that the flanges 30 can be inserted into the aperture from one side of the wall and pass through to the other side of the wall. At 106, the core piece 20 is rotated to bring the flanges 30 out of alignment with the aperture such that the core piece 20 cannot be withdrawn from the aperture. The backing nut 12 can be installed at 108 by aligning the central bore 14 with the first end 24 of the core piece 20 and threading the backing nut 12 onto the threaded portion 26 of the body 22. The method 100 can include the optional steps of coupling a component support structure to the mounting structure 50 of the retention device 10 and mounting a component thereon.

Figure 5:
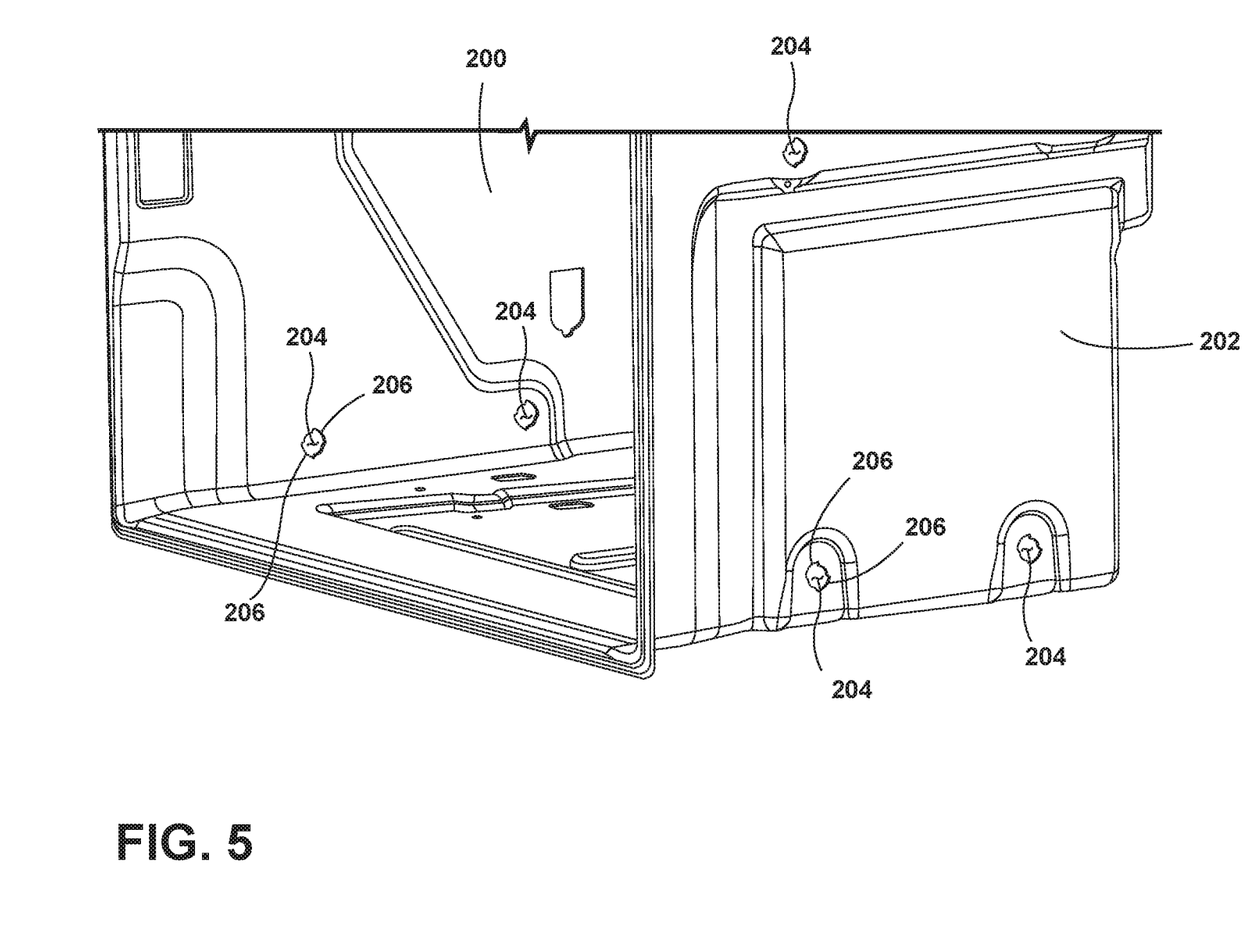
FIG. 5 is a front perspective of a portion of a liner of a refrigerator according to an aspect of the present disclosure.

FIG. 5 illustrates an exemplary wall 200, 202 according to an aspect of the present disclosure into which one or more retention devices 10 can be installed according to the method 100 of FIG. 4. The walls 200, 202 are illustrated as a liner forming part of an interior chamber of a refrigerator; however, it is understood that the walls 200, 202 may form any part of a housing, cavity, chamber, and/or component of a refrigerator or any other home appliance. Each of the walls 200, 202 into which a retention device 10 is to be installed is provided with one or more apertures 204 having a shape that is complementary to the cross-sectional shape of the body 22 of the core piece 20 at the first end 24, including the flanges 30. Each aperture 204 includes a cut-out 206 formed in the wall 200, 202 having a shape that is complementary to the shape of the flanges 30 such that the flanges 30 can pass through the aperture 204 to the other side of the wall 200, 202. The number and dimensions of the cut-outs 206 correspond to the number and dimensions of the flanges 30 to allow the core piece to be installed in the wall 200, 202.

Figure 6:
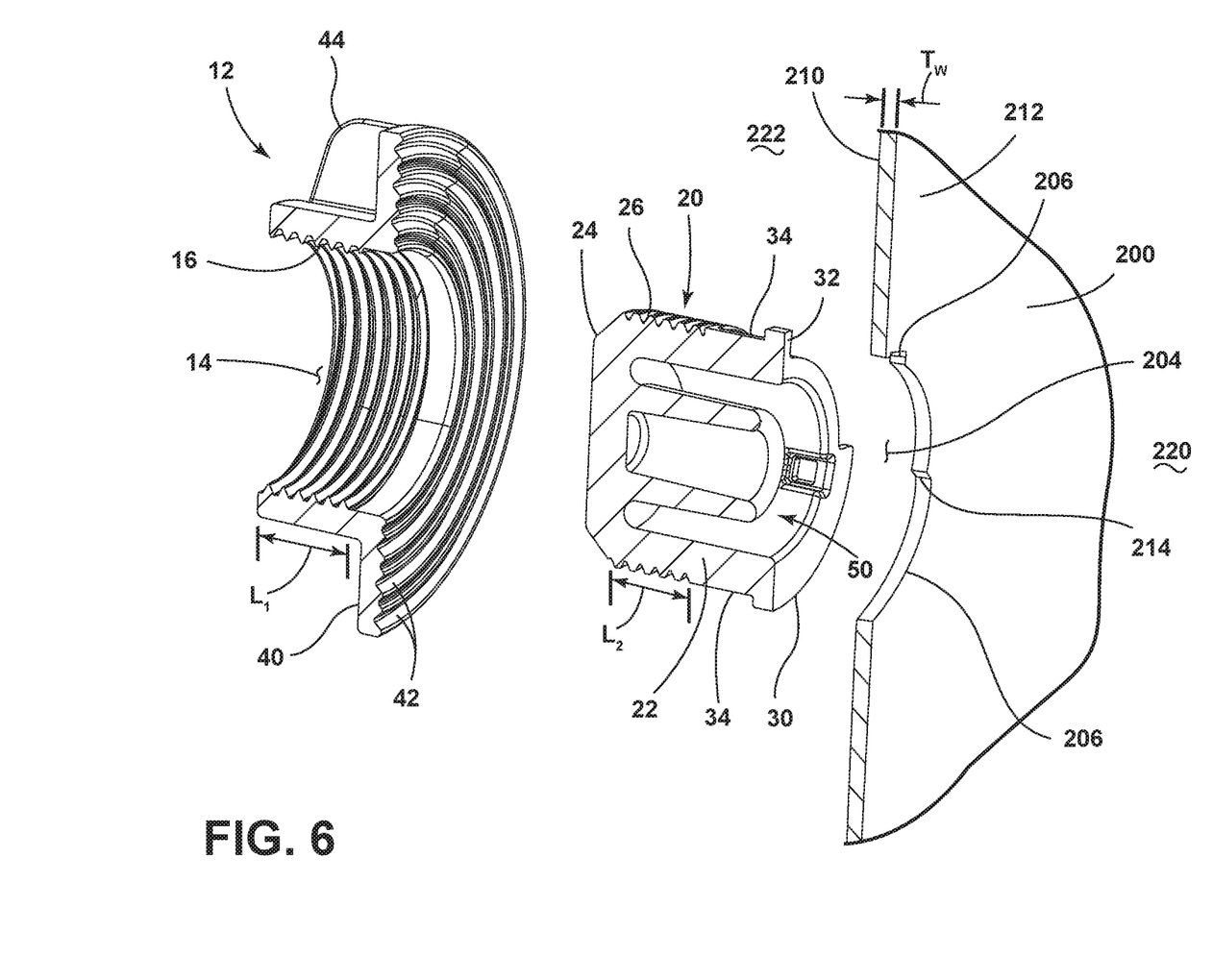
FIG. 6 is an exploded cross-sectional view of a retention device and a wall of a liner of a refrigerator according to an aspect of the present disclosure.
Figure 7:
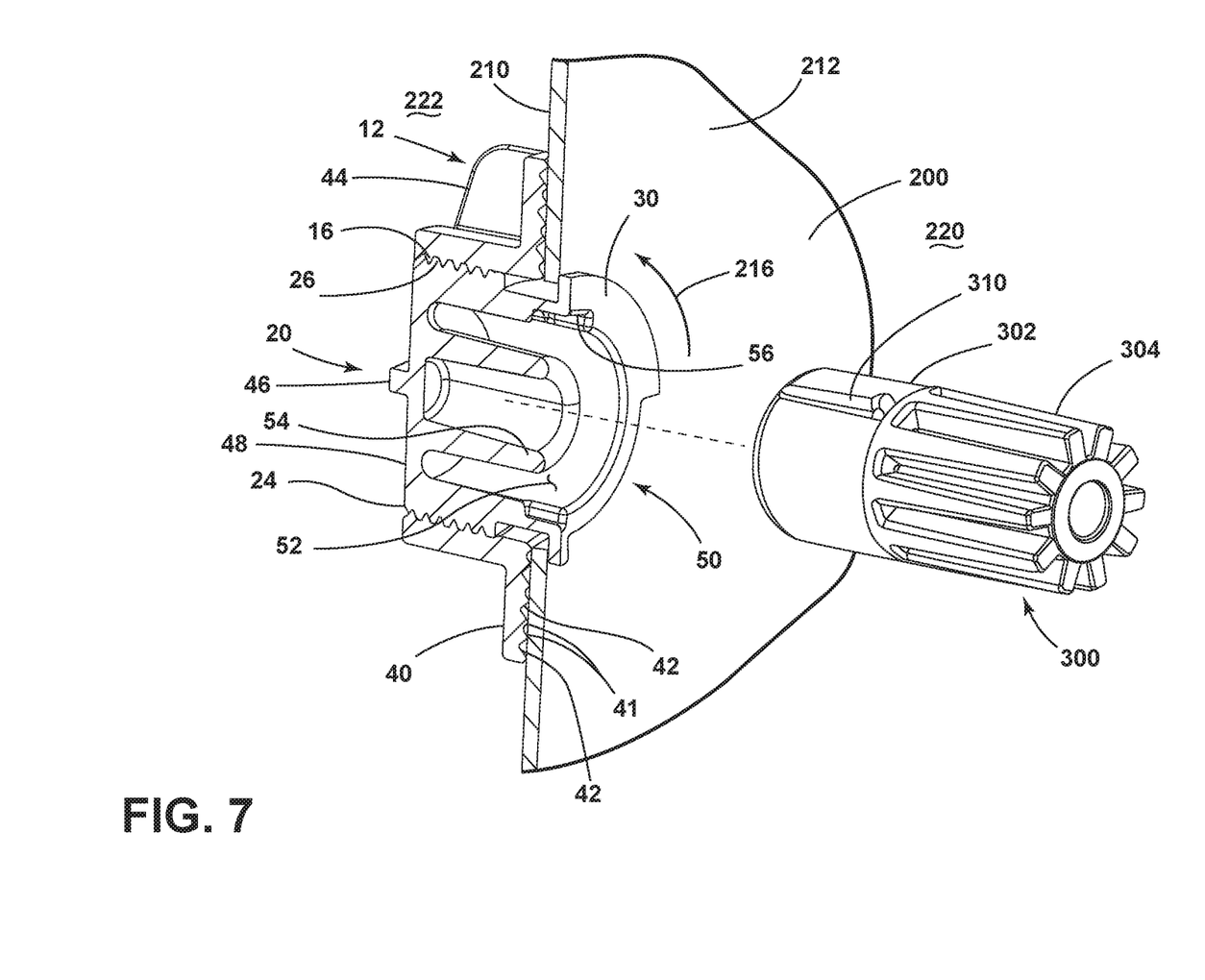
FIG. 7 is a cross-sectional view of a retention device and a component support structure according to an aspect of the present disclosure.

Referring now to FIGS. 6 and 7, to install the retention device 10, the flanges 30 of the core piece 20 are aligned with the cut-outs 206 in the wall 200 on a first side 210 of the wall 200. The core piece 20 is then inserted through the aperture 204 until the flanges 30 pass through the aperture 204 to a second side 212 of the wall 200. As illustrated by arrow 216 in FIG. 7, the core piece 20 is rotated a quarter-turn such that the flanges 30 are no longer in alignment with the cut-outs 206 and engage the second side 212 of the wall 200. Engagement of the flanges 30 with the second side 212 of the wall 200 prevents the core piece 20 from being withdrawn from the aperture 204 from the direction in which the core piece 20 was inserted.

The ribs 34 on the body 22 act as "stops" which prevent the core piece 20 from being rotated more than a quarter-turn. If the core piece 20 was allowed to rotate more than a quarter-turn, the flanges 30 would come into re-alignment with the cut-outs 206 and could thus be withdrawn from the aperture 204 from the first side 210 of the wall 200. The ribs 34 are disposed on the body 22 such that during rotation of the core piece 20 to the position illustrated in FIG. 7, each rib 34 engages an edge 214 defining the cut-out 206 when the flanges 30 have been rotated away from the cut-outs 206 into engagement with the second side 212 of the wall 200. While the retention device 10 of the present disclosure is configured to be installed and engage the second side 212 of the wall 200 through a quarter-turn, it is understood that the extent to which the core piece 20 is rotated during installation will vary depending on the number, dimensions, and spacing of the flanges 30. The optional rib 46 provided on the end surface 48 of the body 22 can be grasped by a user's hand or a tool to facilitate rotation of the core piece 20 during installation.

Still referring to FIGS. 6 and 7, the backing nut 12 is installed onto the core piece 20 from the same side of the wall 200 as the core piece 20 was inserted into the aperture 204. The backing nut 12 is threaded onto the threaded portion 26 of the core piece 20 until the underside of the lip 40 abuts the first side 210 of the wall 200. The radially extending fingers 44 can facilitate rotation of the backing nut 12 by hand or with an appropriate tool. The backing nut 12 facilitates gripping the wall 200 between the backing nut 12 and the flanges 30 of the core piece 20.

With reference to FIG. 6, the threaded surface 16 of the backing nut 12 can have a first length $L_1$ and the threaded portion 26 of the body 22 of the core piece 20 can have a second length $L_2$. The first and second lengths $L_1$ and $L_2$ of the threaded surface 16 and threaded portion 26, respectively, can be configured to allow the extent or degree to which the backing nut 12 is threaded onto the core piece 20 to be adjustable based on a thickness $T_w$ of the wall 200.

As illustrated in FIG. 7, the backing nut 12 is threaded onto the core piece 20 such that the threaded surface 16 completely overlaps with the threaded portion 26. As the thickness $T_w$ of the wall 200 increases, the degree to which the backing nut 12 is threaded onto the core piece 20 can be decreased to account for the increased wall thickness. As the thickness $T_w$ of the wall 200 decreases, the backing nut 12 can be threaded further onto the core piece 20 to account for the thinner wall. In this manner, the length $L_1$ and $L_2$ of the threaded surface 16 and threaded portion 26, respectively, can be based on accommodating a predetermined range of wall thicknesses $T_w$.

Still referring to FIGS. 6 and 7, in some aspects of the present disclosure, the first side 210 of the wall 200 can form part of an interior cavity of a home appliance disposed between an outer housing (not shown) of the home appliance and an appliance chamber which is configured for use by a consumer. The interior cavity is typically configured to house working parts of the home appliance, such as insulation, wiring, plumbing, electronics, etc. For example, the wall 200 can form a part of a refrigerator liner that defines a storage chamber 220 of the refrigerator, with the first side 210 facing an interior cavity 222 of the refrigerator and the second side 212 facing the refrigerator storage chamber 220 in which food is stored.

The backing nut 12 can be tightened onto the core piece 20 until the optional ridges 41 on the underside of the lip 40 abut the first side 210 of the wall 200. When insulation foam is present within interior cavity 222, the optional grooves 42 provided on the lip 40 can decrease the likelihood that the insulation foam will leak around the retention device 10 to the storage chamber 220.

Still referring to FIG. 7, the installed retention device 10 can be coupled with a component support structure 300 to support a component of the appliance relative to the wall 200. The component support structure 300 is configured to mate with the mounting structure 50 provided on the core piece 20. In the exemplary aspect of FIG. 7, the component support structure 300 is in the form of a peg having a first end 302 that is configured to couple with the mounting structure 50 and a second end 304 that is configured to directly or indirectly support a component of the home appliance, non-limiting examples of which include a shelf, a drawer, a bin, a tray, and rack.

The first end 302 of the component support structure 300 includes a hollow portion (not shown) such that the first end 302 is configured to fit within the socket 52 receive the pin 54 therein. The component support structure 300 can further include a pair of retention fingers 310 configured to be received within the channels 56. The component support structure 300 can be configured to couple with the mounting structure 50 through any suitable mechanical fastening mechanism, non-limiting examples of which include a snap-fit, an interference fit, and combinations thereof. In the exemplary aspect illustrated in FIG. 7, the first end 302 can be configured to fit within the socket 52 and receive the pin 54 through an interference fit connection and the retention fingers 310 can be configured to engage the channels 56 through a snap-fit connection.

While the component support structure 300 is illustrated as being coupled with the retention device 10 after the retention device 10 is installed in the wall 200, it is understood that the order of installation is not so limited. For example, the component support structure 300 can be coupled with the core piece 20 prior to insertion of the core piece 20 into the aperture 204 and/or prior to threading of the backing nut 12 onto the core piece 20.

The retention device according to aspects of the present disclosure is configured to provide a two-piece retention device in which both pieces of the retention device can be installed from the same side of a mounting surface. Installation of the retention device from a single side of the mounting surface can provide cost and time savings during installation and assembly of the home appliance. The retention device of the present disclosure can also be configured to accommodate a range of mounting surfaces thicknesses. This allows a single retention device to be utilized with multiple different mounting surfaces, rather than producing a customized retention device for each installation location. For example, a single retention device can be utilized across appliance platforms or in different locations within an appliance for a range of mounting surface thicknesses. The ability to accommodate multiple mounting surface thicknesses can also facilitate a tight fit that can account for machine tolerances with respect to both the mounting surface and the retention device itself.

The retention device of the present disclosure can also be utilized in home appliances in which foam insulation is provided on one side of the mounting surface. The two-piece, rotating design of the present retention device facilitates stability of the retention device within the mounting aperture, even during application of the insulation foam. The optional grooves provided in the backing nut lip can decrease the likelihood that foam will leak through the mounting aperture around the retention device, even without the use of separate O-ring or gasket. However, the backing nut lip could optionally be configured to include an O-ring or gasket, if desired.

Figure 8:
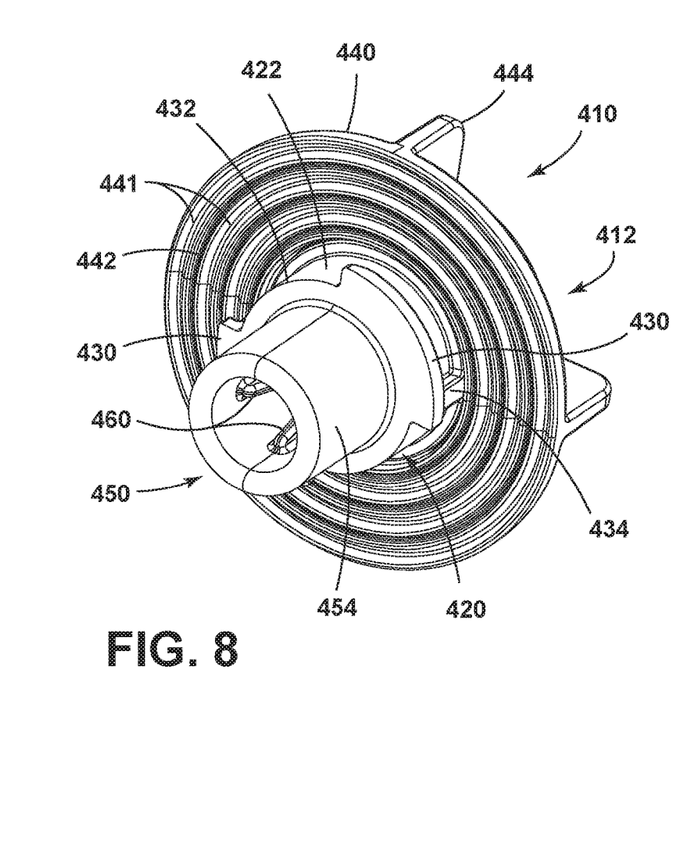
FIG. 8 is a front perspective view of a retention device according to an aspect of the present disclosure.
Figure 9:
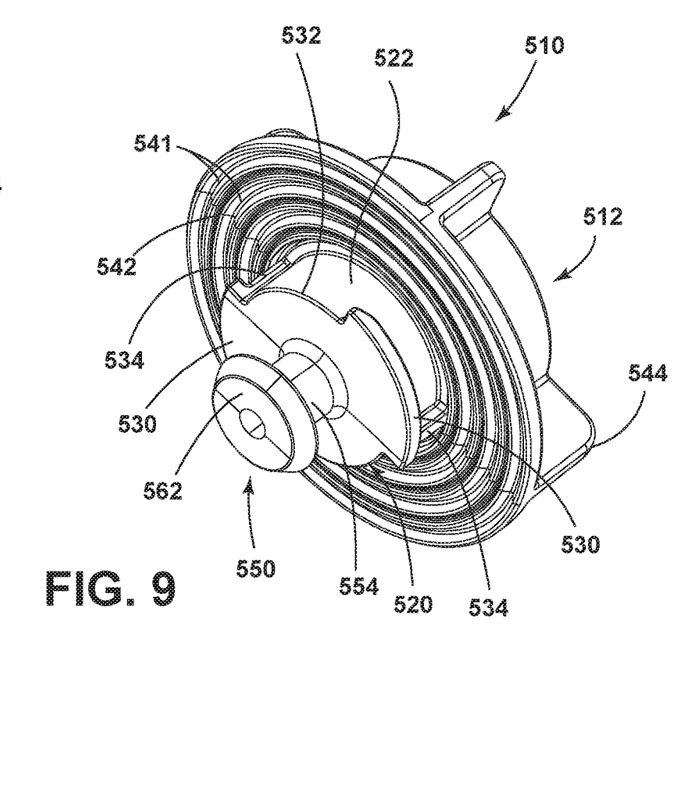
FIG. 9 is a front perspective view of a retention device according to an aspect of the present disclosure.
Figure 10:
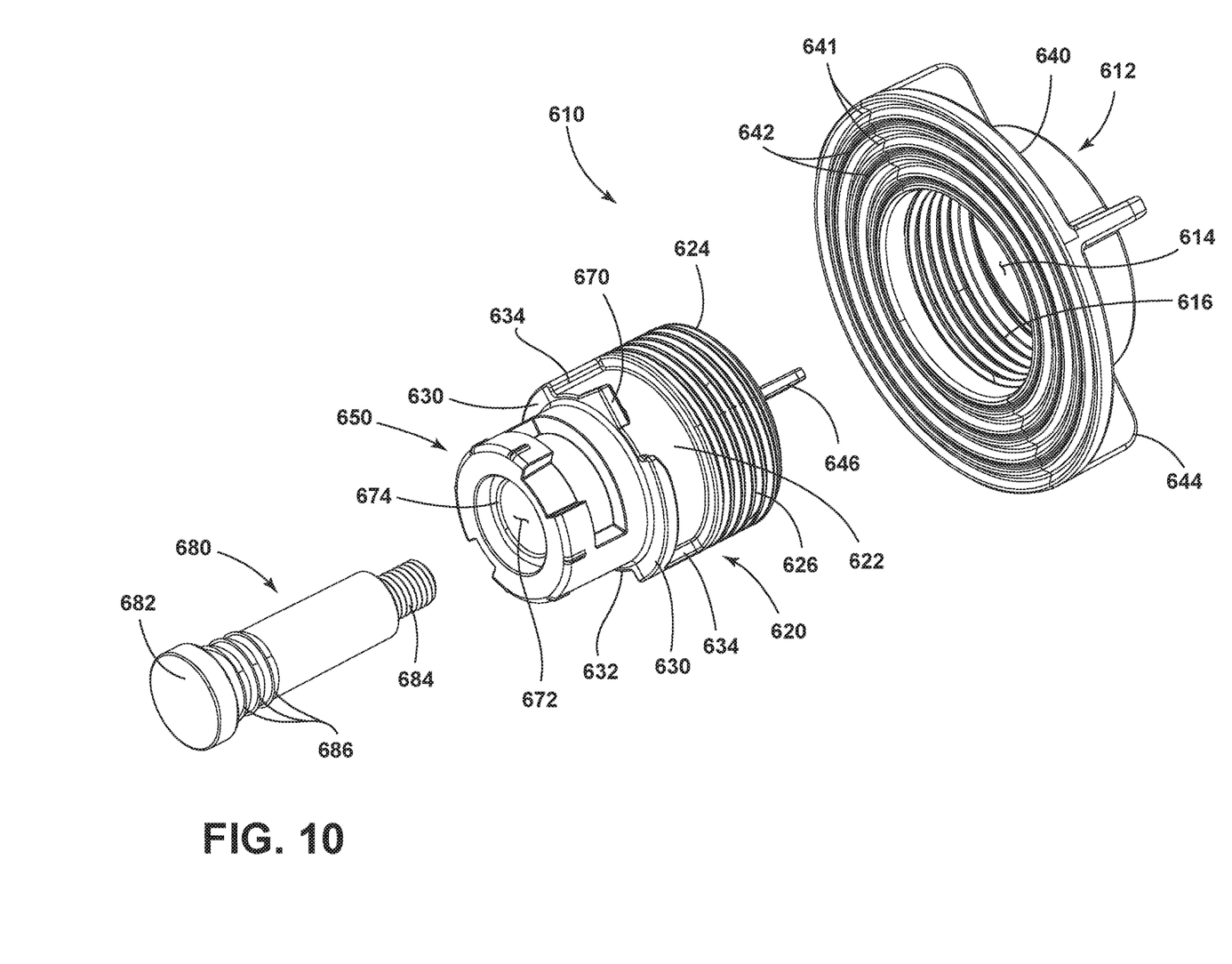
FIG. 10 is an exploded perspective view of a retention device according to an aspect of the present disclosure.

FIGS. 8-10 illustrate additional aspects of the retention device of the present disclosure that can be utilized in a manner similar to that described herein with respect to the retention device 10 of FIGS. 1-7. The retention devices 410, 510, and 610 of FIGS. 8-10, respectively, have many similar features to the retention device 10, but vary in some aspects, such as the configuration of the mounting structure of the core piece. Those features of retention devices 410, 510, and 610 of FIGS. 8-10 that are similar to those of the retention device 10 are labeled with the prefix 400, 500, and 600, respectively.

Referring now to FIG. 8, the retention device 410 includes a backing nut 412 that is similar to the retention device 10 of FIGS. 1-7. The flanges 430 and ribs 434 on the second end 432 of the core piece 420 are similar to those of the retention device 10 such that the backing nut 412 and the core piece 420 can be assembled and installed in a manner similar to that described above with respect to the retention device 10 of FIGS. 1-7.

The core piece 420 includes a mounting structure 450 that differs from the mounting structure 50 of the retention device 10. The mounting structure 450 according to one aspect of the disclosure includes a mounting peg 454 projecting from the second end 432 of the body 422. In one aspect, the mounting peg 454 can be hollow and optionally include a plurality of fingers 460 formed therein. The mounting structure 450 is configured to engage a suitably configured component mounting structure through an interference fit with the exterior and/or the interior of the mounting peg 454.

Referring now to FIG. 9, the retention device 510 includes a backing nut 512 that is similar to the backing nut 10 of FIGS. 1-7. The flanges 530 and ribs 534 on the second end 532 of the core piece 520 are similar to those of the retention device 10 such that the backing nut 512 and the core piece 520 can be assembled and installed in a manner similar to that described above with respect to the retention device 10 of FIGS. 1-7.

The core piece 520 includes a mounting structure 550 that differs from the mounting structure 50 of the retention device 10. The mounting structure 550 according to one aspect of the disclosure includes a mounting peg 554 projecting from the second end 532 of the body 522. The mounting peg 554 includes a head 562 at a distal end thereof having a diameter larger than a diameter of the mounting peg 554. The head 562 can be configured to snap-fit within a suitably sized aperture of a component mounting structure.

Referring now to FIG. 10, the retention device 610 includes a backing nut 612 that is similar to the backing nut 10 of FIGS. 1-7. The flanges 630 and ribs 634 on the second end 632 of the core piece 620 are similar to those of the retention device 10 such that the backing nut 612 and the core piece 620 can be assembled and installed in a manner similar to that described above with respect to the retention device 10 of FIGS. 1-7. The core piece 620 includes a locating flange 670 that facilitates installing the core piece 620 in the desired configuration; the shape of the mounting aperture can be configured to accommodate the cross-sectional shape of the core piece 620 including the flanges 630 and the locating flange 670 for installation of the core piece 620.

The body 622 of the core piece 620 is hollow and includes a socket 672 extending from the second end 632 of the body 622. An exterior surface of the socket 672 is configured to couple with a corresponding component mounting structure. An interior surface of the socket 672 includes an inwardly projecting radial rib 674. The socket 672 is configured to receive an electrical contact member 680 such that an electrical current can be passed through the retention device 610. The electrical contact member 680 can be made from metal or another conductive material to conduct an electrical current through the retention device 610.

According to one aspect, the member 680 can include a plurality of ribs 686 configured to engage the radial rib 674 through a press-fit connection as the member 680 is inserted into the socket 672. The member 680 can include a head 682 configured to pass electricity to the component which is supported by the retention device 610. The member 680 can also include a contact end 684, opposite the head 682, which is configured to receive an electrical current and pass the current through the member 680 for transfer through the head 682 to the mounted component. In the exemplary aspect of FIG. 10, the contact end 684 is illustrated as a threaded end. When the member 680 is inserted into the core piece 620, the contact end 684 is accessible at the first end 624 of the core piece 620. In this manner, an electrical current can be passed from one side of the mounting surface to the other side through the retention device 610. For example, the retention device 610 may be used to mount a shelf having illumination capabilities and the electrical contact member 680 can be utilized to pass an electrical current through the retention device 610 to power the shelf illumination.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A retention device for supporting a component relative to a wall at least partially defining a chamber of a home appliance, the retention device comprising:
   a backing nut defining a central bore and including a threaded surface, the backing nut further including at least two concentric ridges extending about the central bore;
   a core piece comprising:
   a body including a first end having a threaded portion configured to mate with the threaded surface;
   at least one flange disposed at a second end of the body, opposite the first end, the at least one flange projecting outwardly away from the body; and
   at least one rib extending along at least a portion of the body between the flange and the first end; and
   wherein the second end of the body is configured to be inserted into an aperture in said wall and rotated to engage the at least one flange with said wall and engage the at least one rib with an edge of said wall defining the aperture, and wherein the backing nut is configured to be threaded onto the first end of the body to secure the core piece relative to said wall.

2. The retention device of claim 1, wherein the at least one flange comprises a pair of flanges and the at least one rib comprises a pair of ribs.

3. The retention device of claim 1, wherein a length of the central bore threaded surface and a length of the body threaded portion are configured to accommodate a range of wall thicknesses.

4. The retention device of claim 1, wherein the body is configured to be inserted into the aperture on a first side of said wall and the backing nut is threaded onto the body from the same side of said wall.

5. The retention device of claim 1, wherein the body comprises a mounting structure adjacent the second end, the mounting structure configured to couple with a component support structure.

6. The retention device of claim 1, wherein the backing nut comprises a circumferential lip surrounding the central bore, the circumferential lip having a surface configured to engage said wall, and wherein the surface includes at least one circumferential groove.

7. The retention device of claim 1, wherein the backing nut comprises a plurality of radially extending fingers on an exterior surface of the backing nut.

8. The retention device of claim 1, wherein the body and the at least one flange define a cross-sectional shape that is complementary to a shape of the aperture in said wall.

9. A method of assembling at least a portion of a chamber of a home appliance, the method comprising:
   providing a chamber wall having at least one aperture formed therein, the chamber wall includes a first side adjacent said chamber and a second side opposite the first side;
   inserting a core piece into the at least one aperture, the core piece comprising:
   a body including a first end having a threaded portion;
   at least one flange disposed at a second end of the body, opposite the first end, the at least one flange projecting outwardly away from the body; and
   at least one rib extending along at least a portion of the body between the flange and the first end; and
   rotating the core piece within the aperture until the at least one rib engages an edge of the chamber wall defining the aperture and the at least one flange engages the second side of the chamber wall;
   threading a backing nut onto the threaded portion of the body of the core piece until the backing nut engages the chamber wall and varying a degree to which the backing nut is threaded onto the core piece based on a thickness of the chamber wall adjacent the aperture; and
   coupling a component support structure to the second end of the body, the second end of the body including a mounting structure configured to couple with the component support structure.

10. The method of claim 9, wherein the step of inserting the core piece into the at least one aperture further comprises:
    inserting the core piece into the aperture from the first side of the chamber wall; and
    threading the backing nut onto the core piece from the first side of the chamber wall.

11. The method of claim 9, further comprising:
    coupling a component with the component support structure.

12. The method of claim 9, further comprising:
    coupling at least one of a shelf, a drawer, a bin, a tray, and a rack with the component support structure.

13. The method of claim 9, wherein the step of inserting a core piece into the at least one aperture, the step of rotating the core piece within the aperture until the at least one rib engages an edge of the chamber wall defining the aperture and the at least one flange engages the second side of the chamber wall, and the step of threading a backing nut onto the threaded portion of the body until the backing nut engages the chamber wall further comprise:
    repeating each of the steps of inserting a core piece into the at least one aperture, rotating the core piece within the aperture until the at least one rib engages an edge of the chamber wall defining the aperture and the at least one flange engages the second side of the chamber wall, and threading a backing nut onto the threaded portion of the body until the backing nut engages the chamber wall in each of a plurality of apertures provided in the chamber wall.

14. The method of claim 9, wherein the backing nut comprises a circumferential lip surrounding the central bore, and wherein the step of threading a backing nut onto the threaded portion of the body until the backing nut engages the chamber wall further comprises:
    threading the backing nut onto the threaded portion of the body until the circumferential lip engages the chamber wall, the circumferential lip having a surface configured to engage the chamber wall, and wherein the surface includes at least one circumferential groove.

15. A retention device for supporting a component relative to a mounting surface, the retention device comprising:
    a backing nut comprising a threaded central bore;
    a core piece having a body comprising:
    a first end configured to be threadingly received by the central bore;

a second end opposite the first end and configured to engage said mounting surface adjacent an aperture into which the core piece is configured to be inserted; and a mounting structure adjacent the second end and configured to mate with a component support structure to support said component relative to said mounting surface; and wherein the core piece and backing nut are both installed from a first side of said mounting surface and wherein the mounting structure is accessible on a second side of said mounting surface opposite the first side, and wherein the backing nut comprises a circumferential lip surrounding the central bore, the circumferential lip having a surface configured to engage said mounting surface, and wherein the surface includes at least one circumferential groove.

16. The retention device of claim 15, wherein the second end of the body comprises at least one flange projecting outwardly away from the body and at least one rib extending along at least a portion of the body between the flange and the first end to engage said mounting surface.

17. The retention device of claim 15, wherein the threaded portions of the central bore and the core piece have a length configured to accommodate a range of mounting surface thicknesses.

\* \* \* \* \*